US012666415B2

(12) United States Patent
Wei et al.

(10) Patent No.: US 12,666,415 B2
(45) Date of Patent: Jun. 23, 2026

(54) GAP CONFIGURATION IN WIRELESS COMMUNICATIONS

(71) Applicant: QUALCOMM Incorporated, San Diego, CA (US)

(72) Inventors: Chao Wei, Beijing (CN); Jing Lei, San Diego, CA (US); Jing Dai, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 695 days.

(21) Appl. No.: 18/001,840

(22) PCT Filed: Aug. 7, 2020

(86) PCT No.: PCT/CN2020/107817
§ 371 (c)(1),
(2) Date: Dec. 14, 2022

(87) PCT Pub. No.: WO2022/027591
PCT Pub. Date: Feb. 10, 2022

(65) Prior Publication Data
US 2023/0224886 A1    Jul. 13, 2023

(51) Int. Cl.
*H04W 72/12* (2023.01)
*H04L 1/00* (2006.01)
*H04L 5/16* (2006.01)

(52) U.S. Cl.
CPC ........... *H04W 72/12* (2013.01); *H04L 1/0013* (2013.01); *H04L 5/16* (2013.01)

(58) Field of Classification Search
CPC . H04W 72/12; H04W 68/02; H04W 72/0446; H04W 74/0808; H04L 1/0013;
(Continued)

(56) References Cited

U.S. PATENT DOCUMENTS 9,906,452 B1 * 2/2018 Dosovitsky ......... H04L 41/0893
10,588,141 B2    3/2020 Rico Alvarino et al.
(Continued)

FOREIGN PATENT DOCUMENTS

CA        2946897 C  *  9/2023  ........ H04W 72/1268
CN      102804639 A    11/2012
(Continued)

OTHER PUBLICATIONS

Hamidreza Shariatmadari; Achieving Ultrareliable Low-Latency Communications, IEEE 5G, Apr. 25, 2018 (Year: 2018).*
(Continued)

*Primary Examiner* — Phirin Sam
*Assistant Examiner* — Louis Samara
(74) *Attorney, Agent, or Firm* — NORTON ROSE FULBRIGHT US LLP

(57) ABSTRACT

A method of wireless communication may include determining a gap configuration for a mobile device, wherein the gap configuration defines a desired gap between a scheduled downlink transmission for reception by a mobile device and an uplink transmission from the mobile device; determining whether a gap between a scheduled downlink transmission for reception by a mobile device and an uplink transmission from the mobile device is less than a defined number of symbols for the desired gap; and/or puncturing at least one of the downlink transmission and the uplink transmission when the gap is determined to be less than the defined number of symbols. The puncturing may be performed on the downlink transmission and/or the uplink transmission when the scheduled gap is less than a desired gap, and optionally the puncturing is performing without puncturing a CSI-RS, a DMRS, or a PTRS. Other aspects and features are also claimed and described.

36 Claims, 11 Drawing Sheets

(58) Field of Classification Search

CPC ....... H04L 5/16; H04L 5/0044; H04L 5/0053; H04L 5/0094; H04L 41/0893; H04B 7/0413

See application file for complete search history.

(56) References Cited

U.S. PATENT DOCUMENTS

| | | | | |
|---|---|---|---|---|
| 10,645,641 | B2 * | 5/2020 | Li | H04W 74/0808 |
| 11,068,313 | B2 * | 7/2021 | Fontanari Filho | G06F 9/5072 |
| 11,116,001 | B2 | 9/2021 | Wei et al. | |
| 11,272,530 | B2 * | 3/2022 | Davydov | H04B 7/0413 |
| 11,290,147 | B2 * | 3/2022 | Liu | H04W 72/0446 |
| 11,706,800 | B2 * | 7/2023 | Sun | H04W 74/0808 370/329 |
| 11,968,555 | B2 * | 4/2024 | Lee | H04W 24/10 |
| 2011/0013543 | A1 * | 1/2011 | Lim | H04L 5/0094 370/329 |
| 2018/0302915 | A1 * | 10/2018 | Einhaus | H04W 16/14 |
| 2019/0222364 | A1 * | 7/2019 | Shimoda | H04L 1/189 |
| 2019/0260533 | A1 * | 8/2019 | Manolakos | H04B 7/0456 |
| 2019/0380151 | A1 * | 12/2019 | Kim | H04L 5/0053 |
| 2020/0053713 | A1 * | 2/2020 | Bang | H04L 5/0053 |
| 2020/0084081 | A1 * | 3/2020 | Yeo | H04L 5/0044 |
| 2020/0351124 | A1 * | 11/2020 | Babaheidarian | H04L 5/16 |
| 2020/0359411 | A1 * | 11/2020 | Li | H04W 16/14 |
| 2022/0078650 | A1 * | 3/2022 | Lee | H04W 24/08 |
| 2022/0394762 | A1 * | 12/2022 | Bhattad | H04W 74/0808 |
| 2023/0254105 | A1 * | 8/2023 | Wong | H04L 5/0053 370/281 |

FOREIGN PATENT DOCUMENTS

| | | | | | |
|---|---|---|---|---|---|
| CN | 103314539 | A | | 9/2013 | |
| CN | 108886457 | A | | 11/2018 | |
| CN | 110036680 | A | | 7/2019 | |
| CN | 110583091 | A | | 12/2019 | |
| CN | 111247866 | A | * | 6/2020 | H04W 74/004 |
| EP | 4055979 | B1 | * | 2/2024 | H04W 74/0808 |
| WO | 2018005481 | | | 1/2018 | |
| WO | WO-2018226411 | A1 | | 12/2018 | |

OTHER PUBLICATIONS

Supplementary European Search Report—EP20948617—Search Authority—The Hague—Apr. 10, 2024.

International Search Report and Written Opinion—PCT/CN2020/107817—ISA/EPO—May 11, 2021.

Radio Communication: "Study Groups Preliminary Draft Revision of Recommendation ITU-R M.1457-13", 30th Meeting of Working Party 5D, Jun. 20, 2018 (Jun. 20, 2018), 19 Pages, the whole document.

LG Electronics: "Text proposal on Half Duplex for TR 36.888", 3GPP TSG RAN WG1#68bis, R1-121427, Jeju, Korea, Mar. 26-30, 2012, 4 Pages, Section 6.6.

* cited by examiner

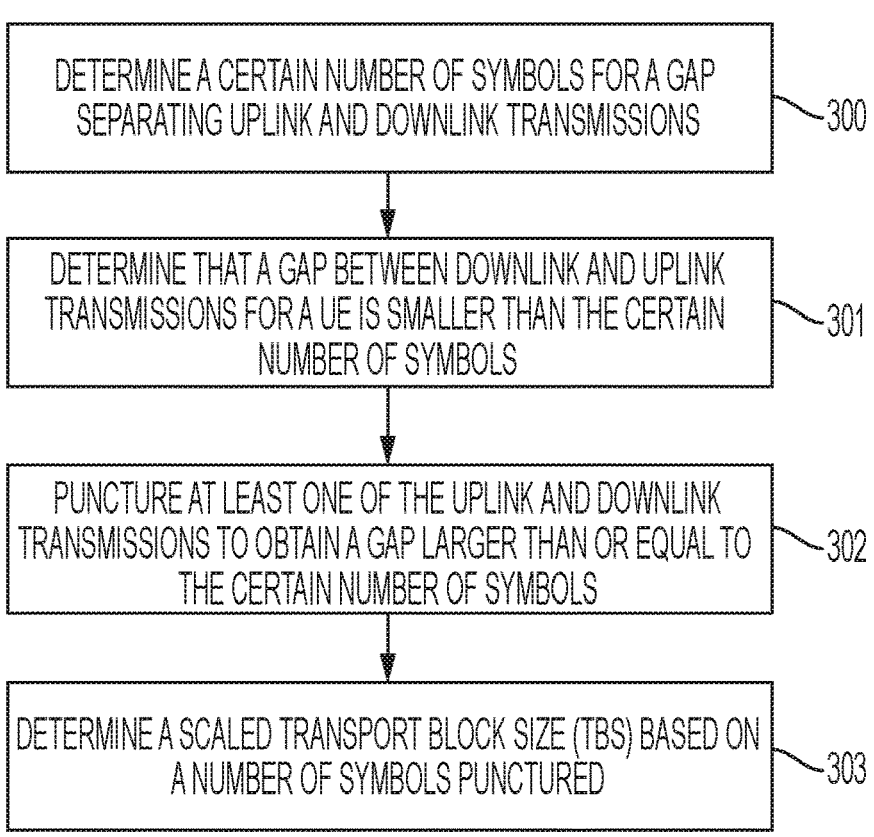

DETERMINE A CERTAIN NUMBER OF SYMBOLS FOR A GAP SEPARATING UPLINK AND DOWNLINK TRANSMISSIONS ⌐300

DETERMINE THAT A GAP BETWEEN DOWNLINK AND UPLINK TRANSMISSIONS FOR A UE IS SMALLER THAN THE CERTAIN NUMBER OF SYMBOLS ⌐301

PUNCTURE AT LEAST ONE OF THE UPLINK AND DOWNLINK TRANSMISSIONS TO OBTAIN A GAP LARGER THAN OR EQUAL TO THE CERTAIN NUMBER OF SYMBOLS ⌐302

DETERMINE A SCALED TRANSPORT BLOCK SIZE (TBS) BASED ON A NUMBER OF SYMBOLS PUNCTURED ⌐303

FIG. 3

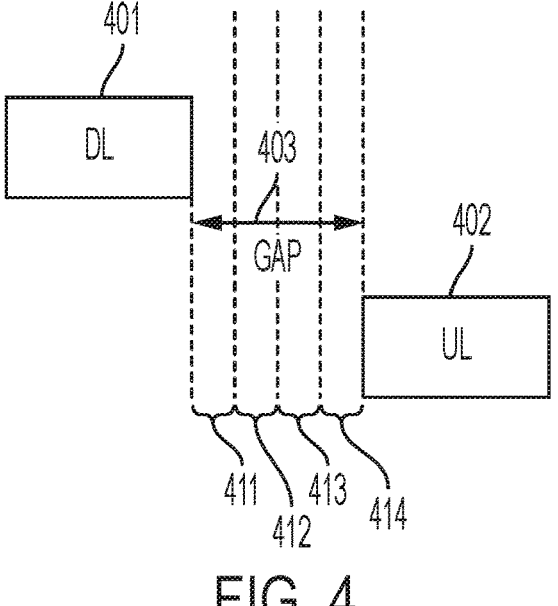

FIG. 4

DETERMINE THAT A GAP BETWEEN DOWNLINK AND UPLINK TRANSMISSIONS FOR A UE IS SMALLER THAN THE CERTAIN NUMBER OF SYMBOLS ~901

PUNCTURING THE DOWNLINK AND UPLINK TRANSMISSION IN SYMBOLS THAT OVERLAP THE CERTAIN NUMBER OF SYMBOLS BETWEEN DOWNLINK AND UPLINK TRANSMISSIONS ~902

| | |
|---|---|
| DETERMINE A CERTAIN NUMBER OF SYMBOLS FOR A GAP SEPARATING UPLINK AND DOWNLINK TRANSMISSIONS | 1100 |
| DETERMINE A RX-TX SWITCHING TIME EXCEEDS THE DETERMINED CERTAIN NUMBER OF SYMBOLS FOR THE GAP | 1101 |
| PUNCTURE AN ADDITIONAL PORTION OF AT LEAST ONE OF THE DOWNLINK OR UPLINK TRANSMISSION | 1102 |
| REQUEST A CHANGE IN THE GAP WHEN THE RX-TX SWITCHING TIME EXCEEDS THE GAP | 1103 |

CONFIGURING A GAP BETWEEN A DOWNLINK AND UPLINK TRANSMISSION FOR A FIRST MOBILE DEVICE ⟶ 1300

DETERMINING A DOWNLINK TRANSMISSION FOR THE FIRST MOBILE DEVICE OVERLAPS THE CONFIGURED GAP AND WILL BE PUNCTURED BY THE FIRST MOBILE DEVICE ⟶ 1301

REALLOCATING RESOURCES IN THE CONFIGURED GAP FOR USE BY SECOND MOBILE DEVICE ⟶ 1302

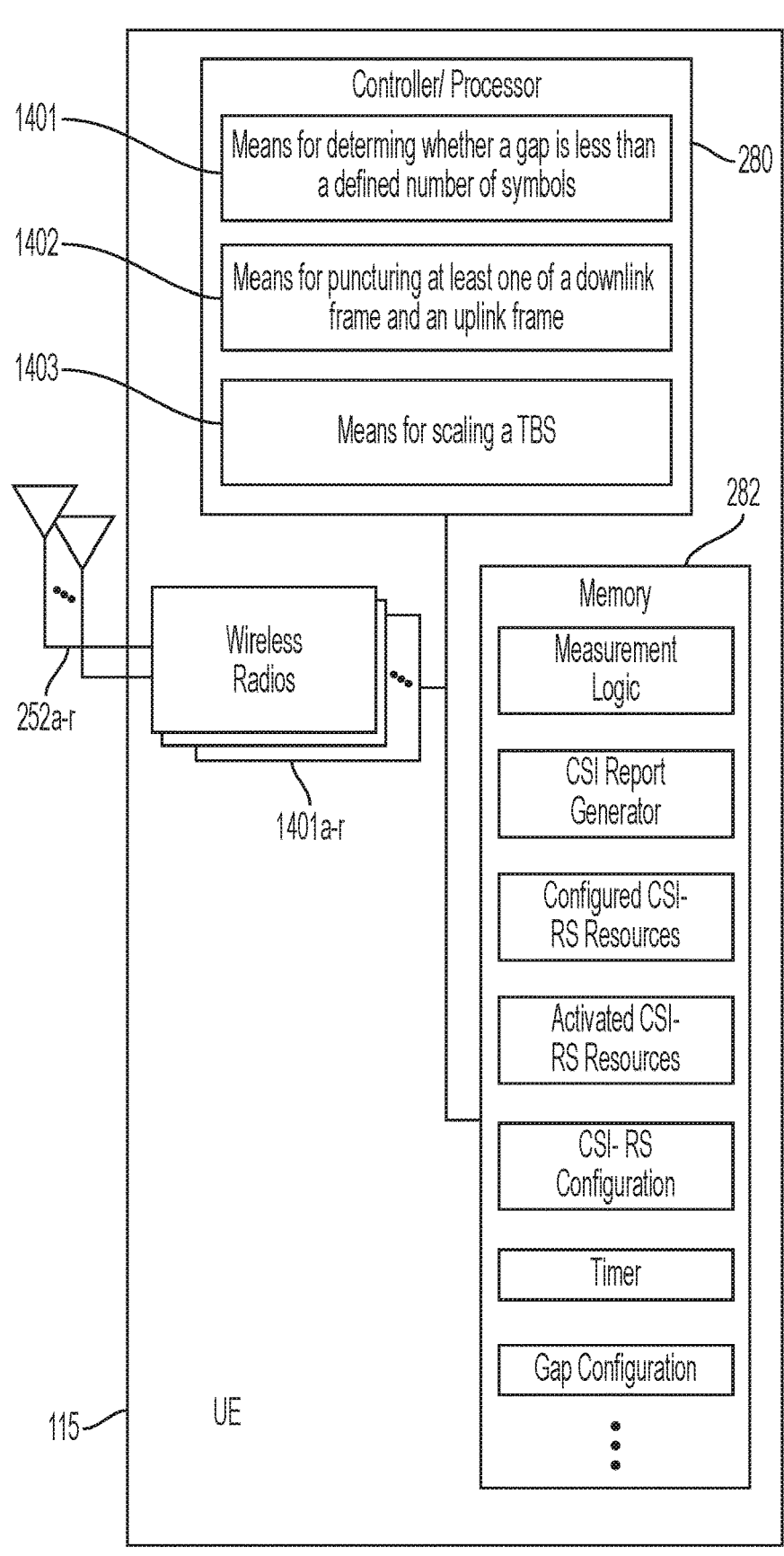

1401

Controller/ Processor

Means for determing whether a gap is less than a defined number of symbols — 280

1402

Means for puncturing at least one of a downlink frame and an uplink frame

1403

Means for scaling a TBS

282

Memory

Measurement Logic

CSI Report Generator

Configured CSI-RS Resources

Activated CSI-RS Resources

CSI- RS Configuration

Timer

Gap Configuration

Wireless Radios 252a-r 1401a-r

GAP CONFIGURATION IN WIRELESS COMMUNICATIONS

TECHNICAL FIELD

Aspects of the present disclosure relate generally to wireless communication systems, and more particularly, to configuring and implementing a defined gap between downlink and uplink transmission for a half-duplex FDD (HD-FDD) Type A user equipment. Certain embodiments of the technology discussed below can enable and provide improved radio frequency (RF) operations in Rx-to-Tx switching.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various aspects of the disclosure relate to techniques for use in a Half-Duplex Frequency Division Multiplexing (HD-FDD) configuration. Half-Duplex techniques allow a UE to operate in a shared-resource environment while reducing duplication of hardware in the UE. A HD-FDD UE operates in either transmit or receive mode, and does not operate in transmit and receive modes simultaneously. Another UE configuration is Full-Duplex Frequency Division Multiplexing (FD-FDD). In Full-Duplex operations the UE is capable of transmitting and receiving simultaneously. Full-Duplex capability may involve duplication of certain hardware resources, such as oscillators, switches, and antennas, to support simultaneous operations, which may increase the cost and complexity of the UE. Half-Duplex operation instead shares these hardware resources, which results in a switching time as the hardware is reconfigured from receive to transmit and transmit to receive.

Various aspects of the disclosure relate to configuring a gap for a UE, which may be used to accommodate for the receive-to-transmit (Rx-Tx) switching time. Implementations may occur in one or more of devices, systems, and methods. A gap (e.g., defined as N symbols) is configured for an HD-FDD Type A UE to avoid a timing-advanced uplink (UL) transmission overlapping with the reception of any preceding downlink transmission. The gap can be used to reconfigure the scheduled downlink transmission. For example, if the ending symbol of a scheduled DL transmission is not at least N symbols before the start of a UL transmission in a slot following the DL transmission, the UE may assume the DL transmission overlapping with the gap is punctured.

In one aspect of the disclosure, a method of wireless communication on a UE may include determining a gap configuration for a mobile device, wherein the gap configuration defines a desired gap between a scheduled downlink transmission for reception by a mobile device and an uplink transmission from the mobile device; determining whether a gap between a scheduled downlink transmission for reception by a mobile device and an uplink transmission from the mobile device is less than a defined number of symbols for the desired gap; and/or puncturing at least one of the downlink transmission and the uplink transmission when the gap is determined to be less than the defined number of symbols. The puncturing may be performed on the downlink transmission and/or the uplink transmission when the scheduled gap is less than a desired gap, and optionally the puncturing is performing without puncturing a CSI-RS, a DMRS, or a PTRS.

In an additional aspect of the disclosure, a the transport block size (TBS) associated with the DL and/or UL transmission may be scaled, such as by scaling proportional to the number of symbols determined to overlap the gap, the number of symbols punctured, and/or a scaling factor received from a higher layer.

In another aspect of the disclosure, the desired gap may be set as part of a gap configuration that is determined by a base station and received by a UE as part of a RRC connection setup procedure. The UE may request shorter or longer gaps through subsequent messaging with the base station.

In an additional aspect of the disclosure, a non-transitory computer-readable medium having program code recorded thereon. The program code further includes code for determining a gap configuration for a mobile device, wherein the gap configuration defines a desired gap between a scheduled downlink transmission for reception by a mobile device and an uplink transmission from the mobile device; determining whether a gap between a scheduled downlink transmission for reception by a mobile device and an uplink transmission from the mobile device is less than a defined number of symbols for the desired gap; and/or puncturing at least one of the downlink transmission and the uplink transmission when the gap is determined to be less than the defined number of symbols.

In an additional aspect of the disclosure, an apparatus configured for wireless communication is disclosed. The apparatus includes at least one processor, and a memory coupled to the processor. The processor is configured to perform steps comprising determining a gap configuration for a mobile device, wherein the gap configuration defines a desired gap between a scheduled downlink transmission for reception by a mobile device and an uplink transmission from the mobile device; determining whether a gap between a scheduled downlink transmission for reception by a mobile device and an uplink transmission from the mobile device is less than a defined number of symbols for the desired gap; and/or puncturing at least one of the downlink transmission and the uplink transmission when the gap is determined to be less than the defined number of symbols.

In one aspect of the disclosure, a method of wireless communication by a base station includes configuring a gap between a downlink and uplink transmission for a first mobile device; determining a downlink transmission for the first mobile device overlaps the configured gap and will be punctured by the first mobile device; and/or allocating resources in the configured gap for use by a second mobile device.

In an additional aspect of the disclosure, a non-transitory computer-readable medium having program code recorded thereon. The program code further includes code to perform steps comprising configuring a gap between a downlink and uplink transmission for a first mobile device; determining a downlink transmission for the first mobile device overlaps the configured gap and will be punctured by the first mobile device; and/or allocating resources in the configured gap for use by a second mobile device.

In an additional aspect of the disclosure, an apparatus configured for wireless communication is disclosed. The apparatus includes at least one processor, and a memory coupled to the processor. The processor is configured to perform steps comprising configuring a gap between a downlink and uplink transmission for a first mobile device; determining a downlink transmission for the first mobile device overlaps the configured gap and will be punctured by the first mobile device; and/or allocating resources in the configured gap for use by a second mobile device Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a flow chart illustrating a method for configuring a gap in wireless communications according to some embodiments of the present disclosure.

FIG. 4 is a block diagram conceptually illustrating a gap configuration for a gap between downlink and uplink transmissions according to some embodiments of the present disclosure.

FIG. 14 is a block diagram illustrating UE configured according to one aspect of the present disclosure.

DETAILED DESCRIPTION

Figure 1:
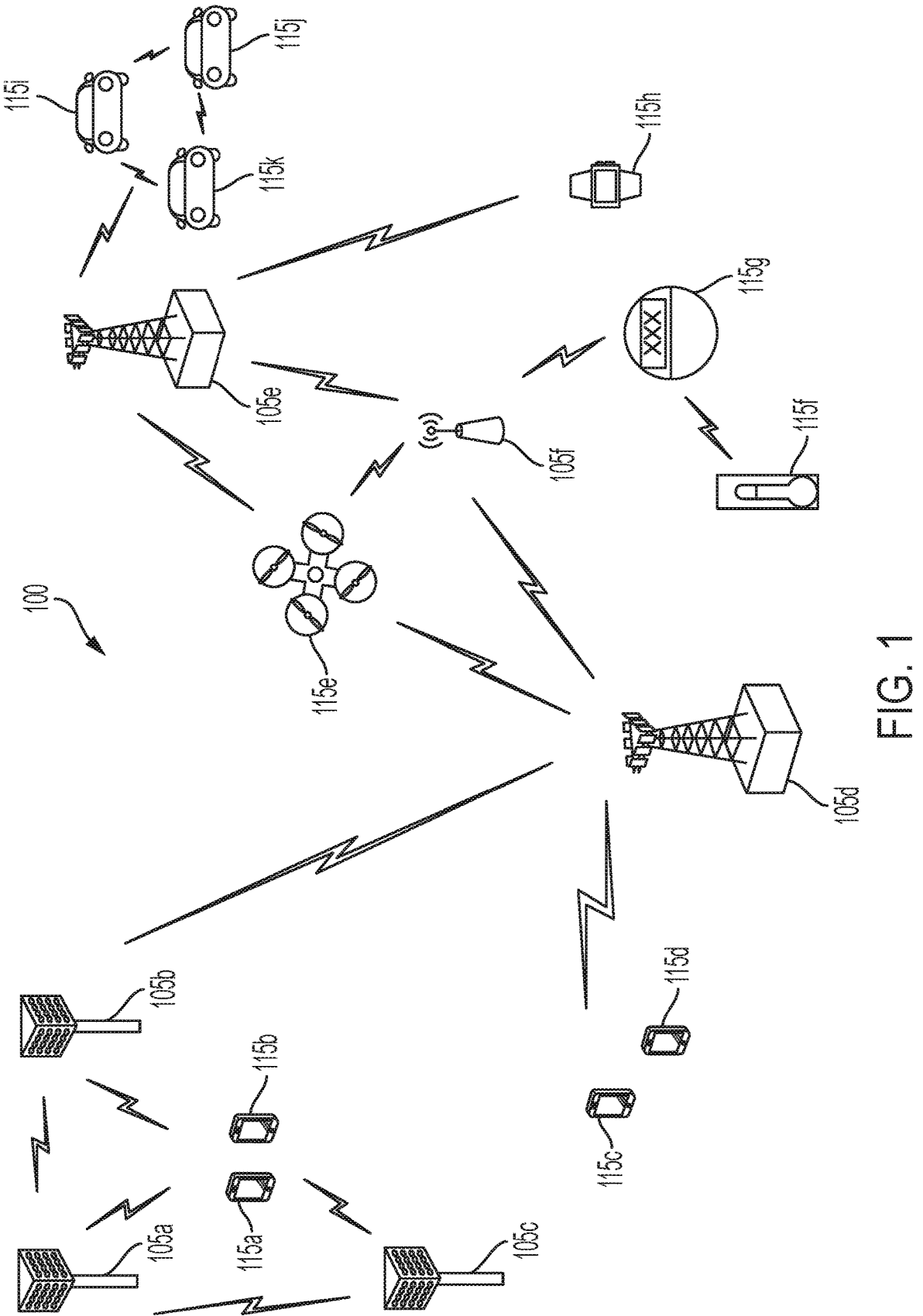
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/$km^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., −0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
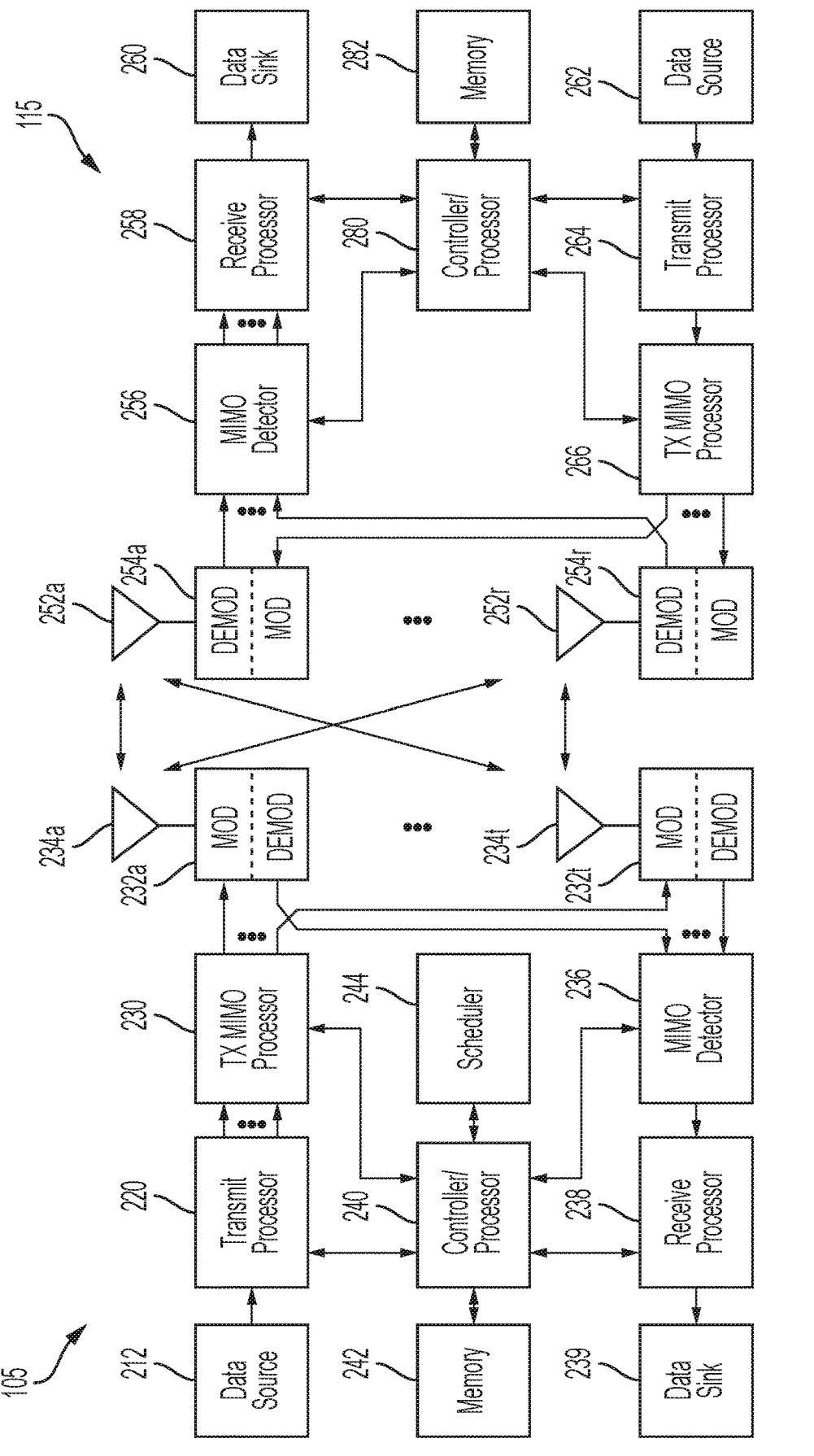
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3, 5, 7, 9, 11, and 13 and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

FIG. 3 is a flow chart illustrating a method for configuring a gap in wireless communications according to some embodiments of the present disclosure. At block 300, a device determines a gap configuration, which may define a certain number of symbols for a gap separating uplink and downlink transmissions during wireless communication. This certain number of symbols may be a desired gap size corresponding to a time that is sufficient for a Rx-Tx transmission cycle, although the gap size need not be limited to the Rx-Tx transmission cycle time. The desired gap size may be determined based, at least in part, on an estimated uplink timing advanced (TA) value, which may be different from the actual TA value at the UE side, or based, at least in part, on the actual TA value at the UE side communicated by the UE to the base station. The determination of the desired gap size by the UE may be made in different implementations by reading a value from memory, receiving a value from a higher layer, receiving an indication in a signaling message from a base station, calculating a value based on current conditions, or a combination thereof. In some embodiments, the gap size can be configured during a RRC connection setup procedure during which the eNB determines an initial gap based on the timing advance (TA) estimation on the received PRACH. The gap size may be updated by the eNB using RRC or MAC CE, such as when the UE moves in the cell resulting in a change in UL TA. The updated gap size can be based a PDCCH order triggered RACH from which the eNB estimates a current UL TA and uses the UL TA to update the gap configuration. Although the gap size is specified as a certain number of symbols, the gap size may alternatively be configured in different units while implementing the present disclosure. For example, the gap size may be configured in time (e.g., milliseconds), frames, subframes, slots, or number of cycles at a particular frequency.

At block 301, a device determines that a gap between particular downlink and uplink transmissions is smaller than the determined certain number of symbols for the gap. The downlink transmission may be scheduled for reception by a mobile device, and the uplink transmission may be scheduled for transmission from the mobile device. This determination may be made by comparing the gap size between scheduled uplink and downlink transmissions with the desired gap size from block 300. In the case that the desired gap size from block 300 is larger than a particular UE's Rx-Tx transmission cycle, the UE may choose to not receive in the configured gap even though the UE may be capable of doing so.

A gap size for a gap configuration is illustrated in FIG. 4. FIG. 4 is a block diagram conceptually illustrating a gap configuration for a gap between downlink and uplink transmissions according to some embodiments of the present disclosure. A downlink transmission 410 is separated from an uplink transmission 402 by a gap 403. The gap 403 may include one or more symbols 411, 412, 413, and 414.

Referring back to FIG. 3 at block 302, at least one of the uplink and downlink transmissions may be punctured based on the determination that the schedule gap is smaller than the desired gap at block 301. Puncturing may refer not receiving certain bits in a transmission, such as by removing some of the parity bits after encoding with an error-correction code. This has the same effect as encoding with an error-correction code with a higher rate, or less redundancy. The puncturing may result in the dropping of information in symbols at the end of the downlink transmission and/or the beginning of the uplink transmission such that the scheduled gap size is effectively increased in size to be at least as large as the desired gap size.

In some embodiments, a scaled transport block size (TBS) may be determined at block 303 based on a number of symbols that are punctured at block 302. The determined TBS scaling may be performed when the gap between downlink and uplink transmissions is smaller than the desired gap at block 301. In some embodiments, the determination of TBS scaling may be based on a timeline requirement for preparing for the associated downlink or uplink transmission. That is, the determined TBS scaling may be performed only when the remaining time to the start of the associated downlink or uplink transmission allows UE to prepare for such transmission with TBS scaling. The determined TBS may be for a scheduled PDSCH transmission when the transmission on the symbols overlapping with the gap is punctured. In some embodiments, the scaling may be proportional to a number of symbols of the downlink transmission determined to overlap the gap. In some embodiments, the TBS scaling is proportional to a predefined scaling factor. In some embodiments, the scaling is proportional to a scaling factor received from higher levels. In some embodiments, the scaling is proportional to a scaling factor received from a base station. In some embodiments, the scaling is proportional to a factor of $$\alpha = \left\lceil 1 - \frac{T_2}{T_1} \right\rceil,$$

wherein $T_1$ is duration of the downlink transmission and $T_2$ is the number of symbols of the downlink transmission determined to overlap the gap. Scaling of the TBS may allow compensating for the SNR loss due to the puncturing illustrated in FIGS. 5-10 by using lower modulation and coding schemes (MCS) for physical downlink shared channel (PDSCH) transmissions.

The puncturing of the downlink or uplink transmissions by the UE may be performed without the scheduler at the eNB accounting for a timing advance (TA) of the UE. Having the UE assume the puncturing of information as illustrated in the examples of FIGS. 5-10, resources utilization may be improved by allowing the eNB to reallocate the overlapping resources to other UEs. Assuming the puncturing as described herein also allows for reduced complexity in the scheduler by reducing the requirement that the scheduler account for joint scheduling of both uplink and downlink traffic.

The explicit gap configuration through the use of a desired gap size described in FIG. 3 may provide more efficient operation at a base station and improved utilization of limited network resources over a scheduler-based system with no gap configuration. In one example scenario, a UE may be scheduled with a DL transmission in slot N and also scheduled with a UL transmission in slot N+1, with the UL grant received after the DL grant. In a conventional scheduler-based system, the UL transmission is scheduled to start after the DL transmission plus a switching gap, such that the UL transmission is started in symbol K of slot N+1 instead of starting the UL transmission in symbol 0 of slot N+1, assuming k symbols used for Rx-to-Tx switching. This reduce the duration of the UL transmission, which may reduce UL coverage and throughput, especially for UL transmission using slot aggregation. Alternatively as described in embodiments of the present disclosure, the scheduled DL transmission may be punctured in order to not degrade UL performance.

In another example, the DL grant scheduling a DL transmission in slot N may be received after the UL grant scheduling a UL transmission in slot N+1 and the DL transmission has higher priority than the UL transmission. Higher prioritization may occur when the DL transmission is URLLC traffic, HARQ retransmission, or an aperiodic CSI-RS for CSI reporting. In a conventional scheduler-based system, the DL transmission is ended a certain gap before the scheduled UL transmission, which may significantly degrade DL performance, such as by causing CRC errors or CSI-RS puncturing. Alternatively as described in embodiments of the present disclosure, the UL transmission may be adjusted either by puncturing or postponing such that DL transmission performance is maintained.

Figure 5:
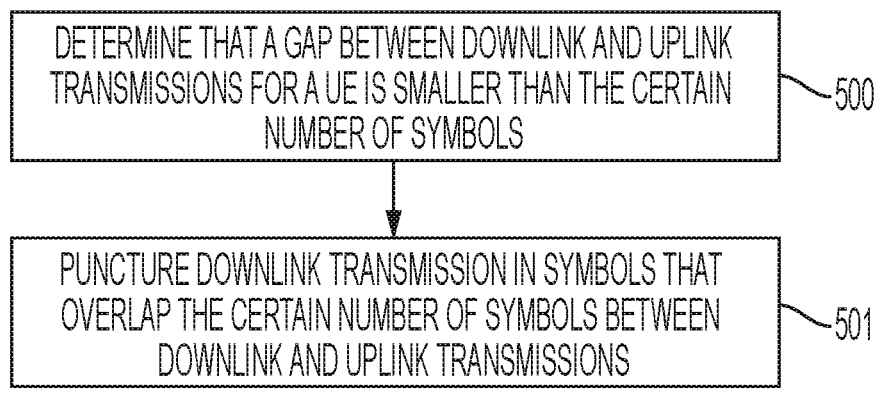
FIG. 5 is a flow chart illustrating a method for puncturing a downlink transmission according to some embodiments of the present disclosure.
Figure 6:
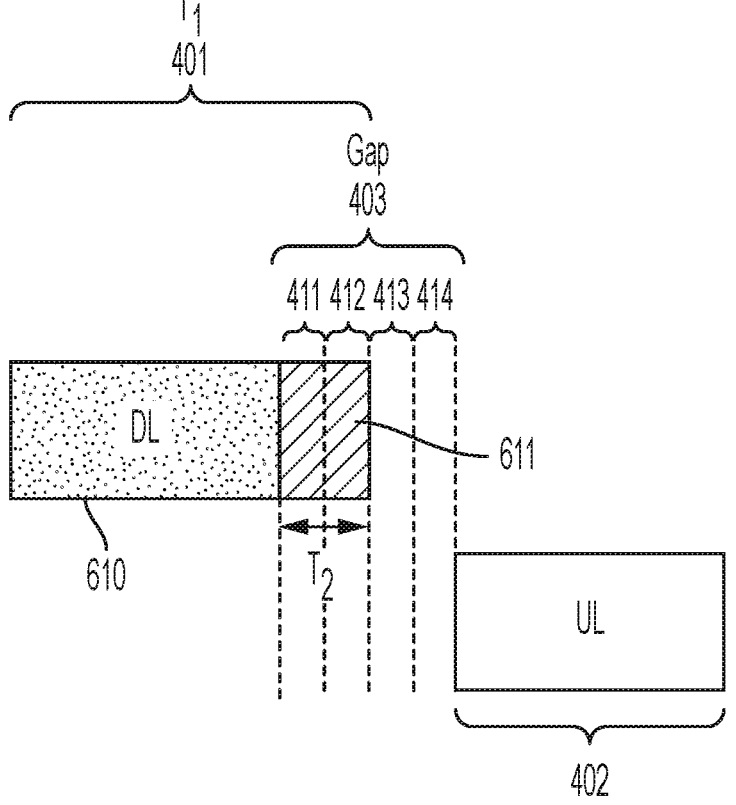
FIG. 6 is a block diagram conceptually illustrating puncturing of a downlink transmission according to some embodiments of the present disclosure.
Figure 7:
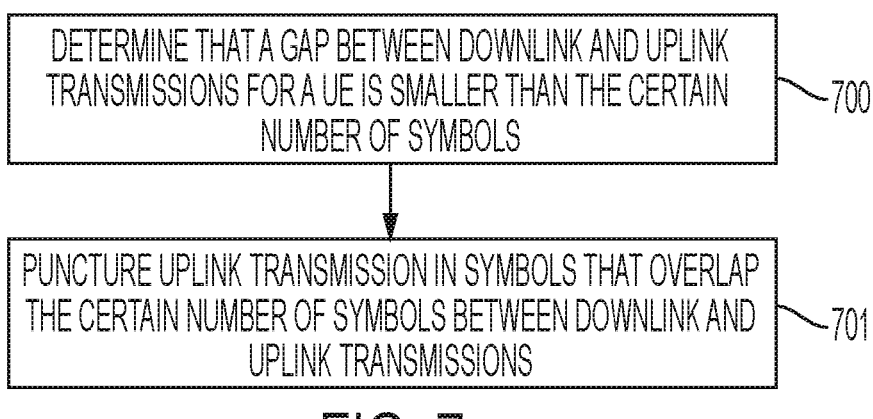
FIG. 7 is a flow chart illustrating a method for puncturing an uplink transmission according to some embodiments of the present disclosure.
Figure 8:
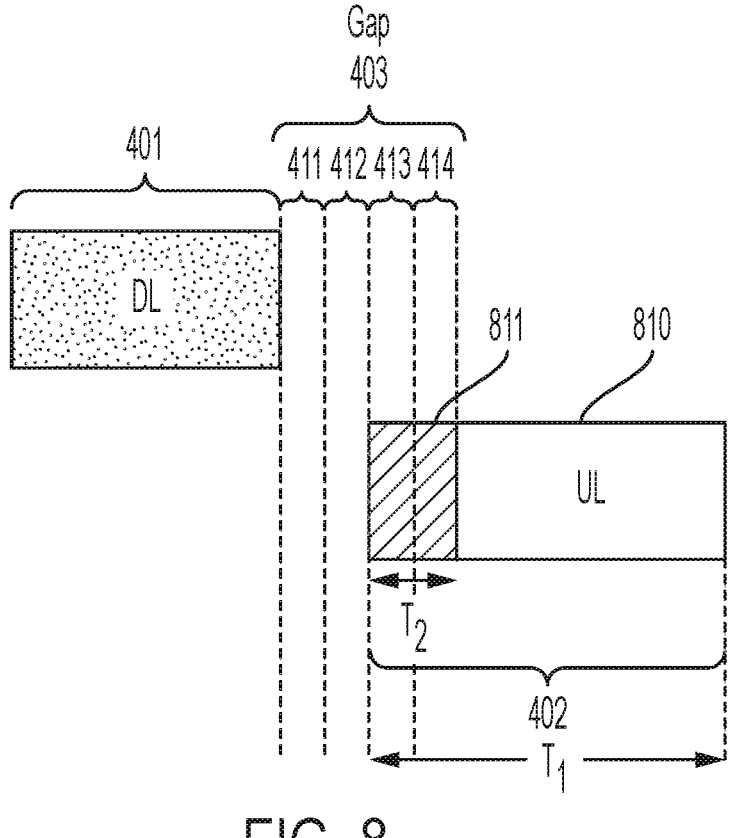
FIG. 8 is a block diagram conceptually illustrating puncturing of an uplink transmission according to some embodiments of the present disclosure.
Figure 9:
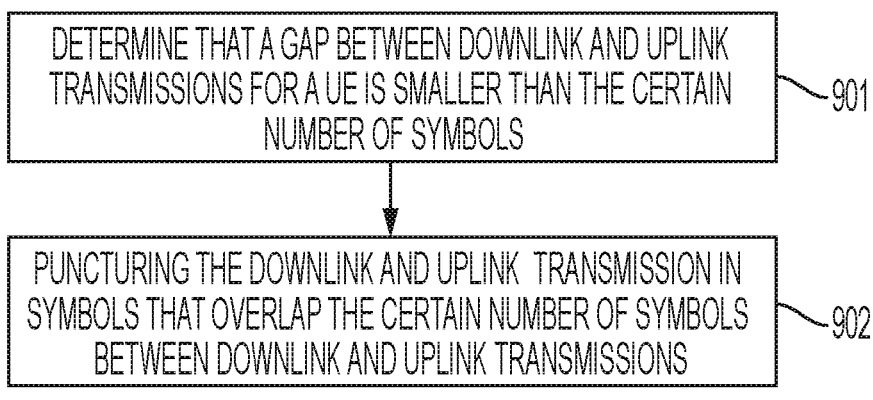
FIG. 9 is a flow chart illustrating a method for puncturing a downlink and an uplink transmission according to some embodiments of the present disclosure.
Figure 10:
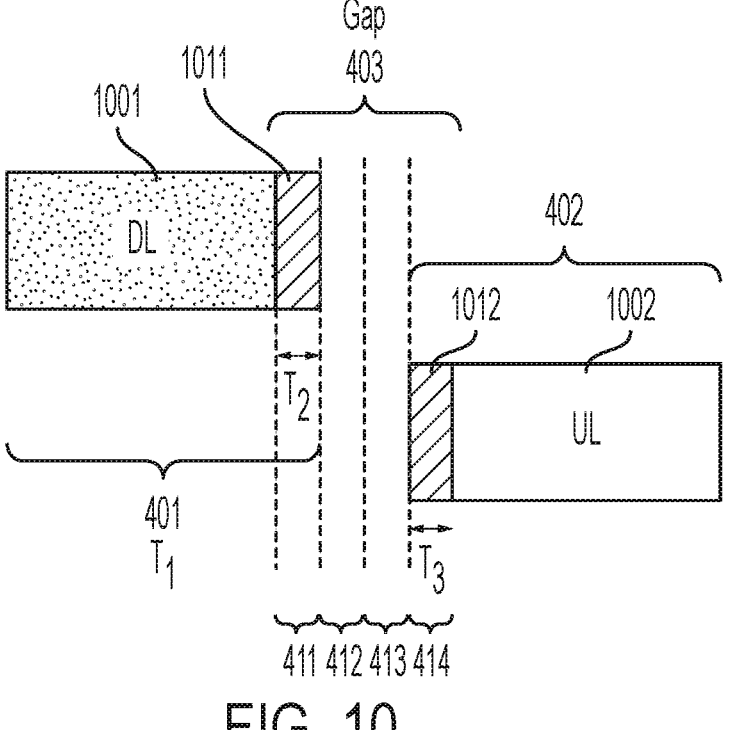
FIG. 10 is a block diagram conceptually illustrating puncturing a downlink and an uplink transmission according to some embodiments of the present disclosure.

Specific example implementations of the puncturing are described with illustrations in FIGS. 5-10. For example, an implementation involving puncturing the downlink transmission is illustrated in FIGS. 5-6, an implementation involving puncturing the uplink transmission is illustrated in FIGS. 7-8, and an implementation involving puncturing the downlink and uplink transmissions is illustrated in FIGS. 9-10.

FIG. 5 is a flow chart illustrating a method for puncturing a downlink transmission according to some embodiments of the present disclosure. At block 500, the device determines that a gap between downlink and uplink transmissions for a UE is smaller than the desired gap size by being less than a certain number of symbols. At block 501, a downlink transmission is punctured in symbols that overlap the certain number of symbols. For example, the certain number of symbols may be counted backwards from the scheduled uplink transmission to define the gap for that uplink transmission. Then, any portion of the downlink transmission that extends into that gap may be punctured by not receiving and processing information in the symbols corresponding to that portion of the downlink transmission. If the puncturing results in a number of remaining symbols in the DL transmission being lower than a threshold number (e.g., two) of symbols then the DL transmission may be dropped. The puncturing of a downlink transmission is illustrated in FIG. 6.

FIG. 6 is a block diagram conceptually illustrating puncturing of a downlink transmission according to some embodiments of the present disclosure. The gap 403 is determined by locating a start of the scheduled uplink transmission 402 and counting backwards the certain number of symbols. For example, if the certain number of symbols is determined to be four, then symbols 411, 412, 413, and 414 define the gap 403. The downlink transmission 401 has a duration of T1 that overlaps the gap 403 by a time period T2. A portion 611 of the downlink transmission 401 in symbols 411 and 412 of the gap 403 are punctured, leaving portion 610 of the downlink transmission 401 for reception and processing.

FIGS. 5-6 illustrate puncturing of a downlink transmission by defining the gap such that the gap ends at the scheduled uplink transmission. However, as described in the method of FIG. 3 the puncturing may alternatively occur in the uplink transmission. FIGS. 7-8 describe an embodiment involving the puncturing of the uplink transmission.

FIG. 7 is a flow chart illustrating a method for puncturing an uplink transmission according to some embodiments of the present disclosure. At block 700, the device determines that a gap between downlink and uplink transmissions for a UE is smaller than the desired gap size by being less than a certain number of symbols. At block 701, an uplink transmission is punctured in symbols that overlap the certain number of symbols. For example, the certain number of symbols may be counted forwards from the end of the scheduled downlink transmission to define the gap for that downlink transmission. Then, any portion of the uplink transmission that extends into that gap, such as by being scheduled for a symbol earlier than the gap, may be punctured by processing and transmitting information in the symbols corresponding to that portion of the scheduled uplink transmission. If the puncturing results in a number of remaining symbols in the UL transmission being lower than a threshold number (e.g., two) of symbols then the UL transmission may be dropped. The puncturing of a downlink transmission is illustrated in FIG. 8.

FIG. 8 is a block diagram conceptually illustrating puncturing of an uplink transmission according to some embodiments of the present disclosure. The gap 403 is determined by locating a start of the downlink transmission 401 and counting forwards the certain number of symbols. For example, if the certain number of symbols is determined to be four, then symbols 411, 412, 413, and 414 define the gap 403. The uplink transmission 402 has a duration of T1 and overlaps the gap 403 by a time period T2. A portion 811 of the downlink transmission 401 in symbols 413 and 414 of the gap 403 are punctured, leaving portion 810 of the uplink transmission 402 for processing and transmission.

Although puncturing of a downlink or uplink transmission is described herein, the UE may also or alternatively postpone the uplink transmission 402 when the gap is determined to be less than the certain number of symbols. The postponing may include postponing the uplink transmission by a number of symbols that overlap the defined number of symbols when the gap is determined to be less than the defined number of symbols. When postponing is performed, the postponing may occur without changing an ending symbol of the scheduled UL transmission. Postponing is distinguished from puncturing in which resources overlapped with the gap are counted in the mapping but not used for transmission. Instead, when postponing, resources overlapped with the gap are not counted in the mapping and not used for transmission.

FIGS. 5-6 illustrate puncturing of a downlink transmission by defining the gap such that the gap ends at the scheduled uplink transmission, and FIGS. 7-8 illustrate puncturing of an uplink transmission by defining the gap such that the gap starts at the end of the scheduled downlink transmission. However, as described in the method of FIG. 3 the puncturing may be applied to the downlink and the uplink transmission in equal or unequal amounts. FIGS. 9-10 describe an embodiment involving the puncturing of the uplink transmission.

FIG. 9 is a flow chart illustrating a method for puncturing a downlink and an uplink transmission according to some embodiments of the present disclosure. At block 900, the device determines that a gap between downlink and uplink transmissions for a UE is smaller than the desired gap size by being less than a certain number of symbols. At block 901, a downlink and an uplink transmission are punctured in symbols that overlap the certain number of symbols defining the gap. For example, a first number of symbols may be punctured from the downlink transmission and a second number of symbols may be punctured from the uplink transmission. The first and second number of punctured symbols may be equal (e.g., symmetric) or unequal (e.g., asymmetric). The number of symbols punctured may be determined by selecting the punctured symbols to avoid puncturing an aperiodic CSI-RS, a DMRS, or a PTRS. The puncturing of uplink and downlink transmission is illustrated in FIG. 10.

FIG. 10 is a block diagram conceptually illustrating puncturing a downlink and an uplink transmission according to some embodiments of the present disclosure. The gap 403 is determined and positioned to overlap with the downlink transmission 401 and the uplink transmission 402. For example, if the certain number of symbols is determined to be four, then symbols 411, 412, 413, and 414 define the gap 403. The uplink transmission 402 has a duration of T1 and overlaps the gap 403 by a time period T2. A portion 1011 of the downlink transmission 401 in symbol 411 of the gap 403 is punctured, leaving portion 1001 of the downlink transmission 401 for processing and transmission. The downlink transmission 401 has a duration of T1 and overlaps the gap 403 by a time period T2. A portion 1011 of the downlink transmission 401 in symbol 411 of the gap 403 is punctured, leaving portion 1001 of the downlink transmission 401 for reception and processing. The uplink transmission 402 overlaps the gap 403 by a time period T3. A portion 1012 of the uplink transmission 402 in symbol 414 of the gap 403 is punctured, leaving portion 1002 of the uplink transmission 402 for processing and transmission.

The puncturing of downlink and/or uplink transmissions illustrated in FIGS. 4-10 may define a gap period between downlink and uplink transmissions. In certain implementations or in certain devices, the gap may be insufficient to accommodate Rx-to-Tx switching. The device may puncture additional portions of a transmission when the gap is determined to be insufficient. The device may alternatively or additionally request a change in the gap.

Figures 11, 12:
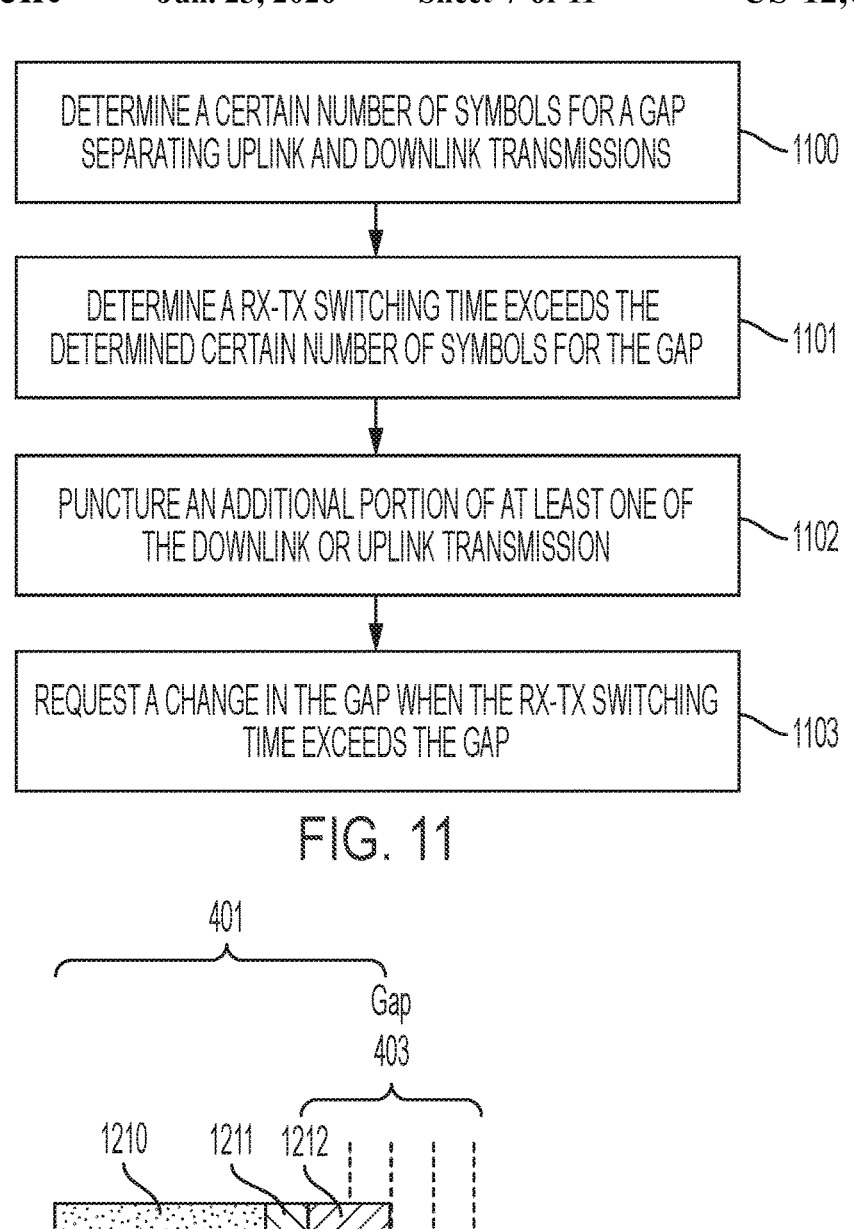
FIG. 11 is a flow chart illustrating a method for puncturing additional portions of transmission according to some embodiments of the present disclosure.
FIG. 12 is a block diagram conceptually illustrating additional puncturing to accommodate Rx-Tx switching according to some embodiments of the present disclosure.

FIG. 11 is a flow chart illustrating a method for puncturing additional portions of transmissions according to some embodiments of the present disclosure. At block 1100, the device determines that a gap between downlink and uplink transmissions for a UE is smaller than the desired gap size by being less than a certain number of symbols. At block 1101, the device determines that a Rx-Tx switching time exceeds the determined certain number of symbols for the desired gap size determined at block 1100. Then, in response to the desired gap size being smaller than the Tx-Tx transmission time, at block 1102 additional portions of at least one of the downlink and uplink transmissions are punctured, in addition to the puncturing described in FIGS. 4-10. The device may also or alternatively request, at block 1103, a change in the gap in response to the desired gap size being smaller than the Tx-Tx transmission time.

FIG. 12 is a block diagram conceptually illustrating additional puncturing to accommodate Rx-Tx switching according to some embodiments of the present disclosure. The gap 403 is determined and positioned to overlap with the downlink transmission 401. For example, if the certain number of symbols is determined to be four, then symbols 411, 412, 413, and 414 define the gap 403. The downlink transmission 401 overlaps the gap 403 in symbols 411 and 412. The Rx-Tx switching cycle 1203 for the device exceeds the gap 403. Portion 1211 of downlink transmission 401 in symbol 1201 is additionally punctured to accommodate the Rx-Tx switching cycle 1203. A portion 1210 of downlink transmission 401 remains for reception and processing. The device may request the gap 403 be extended to match or exceed by a predetermined amount the Rx-Tx switching duration 1203.

Figure 13:
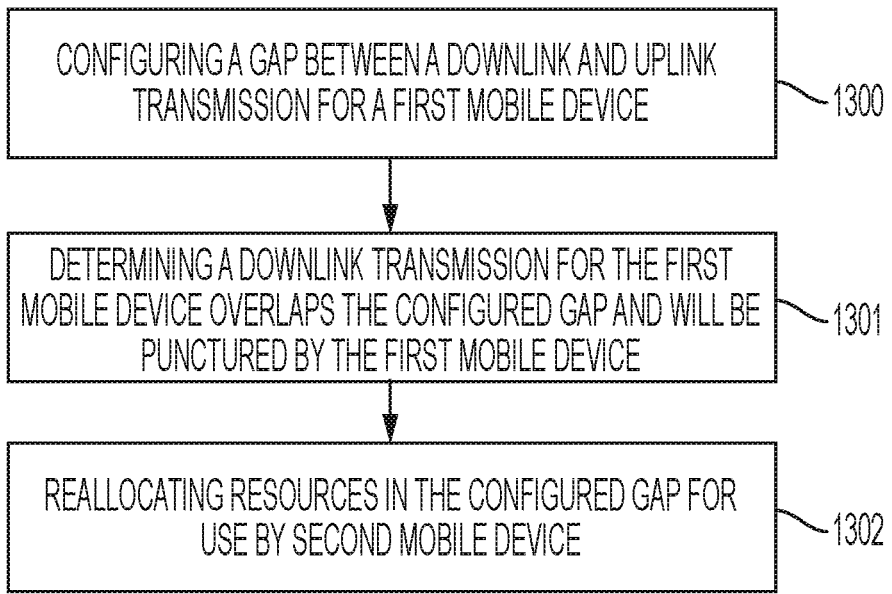
FIG. 13 is a flow chart illustrating a method of reallocating resources that are freed by the UE puncturing transmissions in a configured gap according to some embodiments of the present disclosure.

FIG. 13 is a flow chart illustrating a method of reallocating resources that are freed by the UE puncturing transmissions in a configured gap according to some embodiments of the present disclosure. A block 1300 includes configuring a gap between a downlink and an uplink transmission for a first mobile device. A block 1301 includes determining a downlink transmission for the first mobile device overlaps the configured gap for a scheduled UL transmission. The first mobile device may be configured to puncture transmissions in the gap, such that the determination at block 1301 may indicate that there are resources available for re-use. That is, if the first mobile device is not going to receive and process a punctured portion of a transmission, then the resources in that punctured portion of the transmission are available to be reallocated for other purposes, such as transmission to another mobile device. At block 1302 those resources in the configured gap are reallocated for use by a second mobile device.

The configured gap size changes operation on the UE and the base station. In response to the configured gap, the UE may puncture bits by not receiving some downlink and/or uplink symbols. For the base station, the base station can perform scheduling of resources with knowledge regarding when a UE will puncture such that the base station can reallocate the resources (e.g., symbols) in the punctured period. This reallocation, such as to other UEs (e.g., not HD-FDD), improves the resource utilization. Without the configured gap, the base station does not know when the UE applies puncturing and thus cannot reallocate the resources to other UEs.

FIGS. 3, 5, 7, 9, 11, and 13 are block diagrams illustrating example blocks executed to implement one aspect of the present disclosure. The example blocks will also be described with respect to UE 115 as illustrated in FIG. 14. FIG. 14 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1400*a-r* and antennas 252*a-r*. Wireless radios 1400*a-r* includes various components and hardware, as illustrated in FIG. 2 for UE 115, including modulator/demodulators 254*a-r*, MIMO detector 256, receive processor 258, transmit processor 264, and TX MIMO processor 266. The processor 280 may include a means 1401 for determining whether a gap is less than a defined number of symbols, may include a means 1402 for puncturing at least one of a downlink transmission and an uplink transmission, and/or may include a means 1403 for scaling a TBS.

Figure 15:
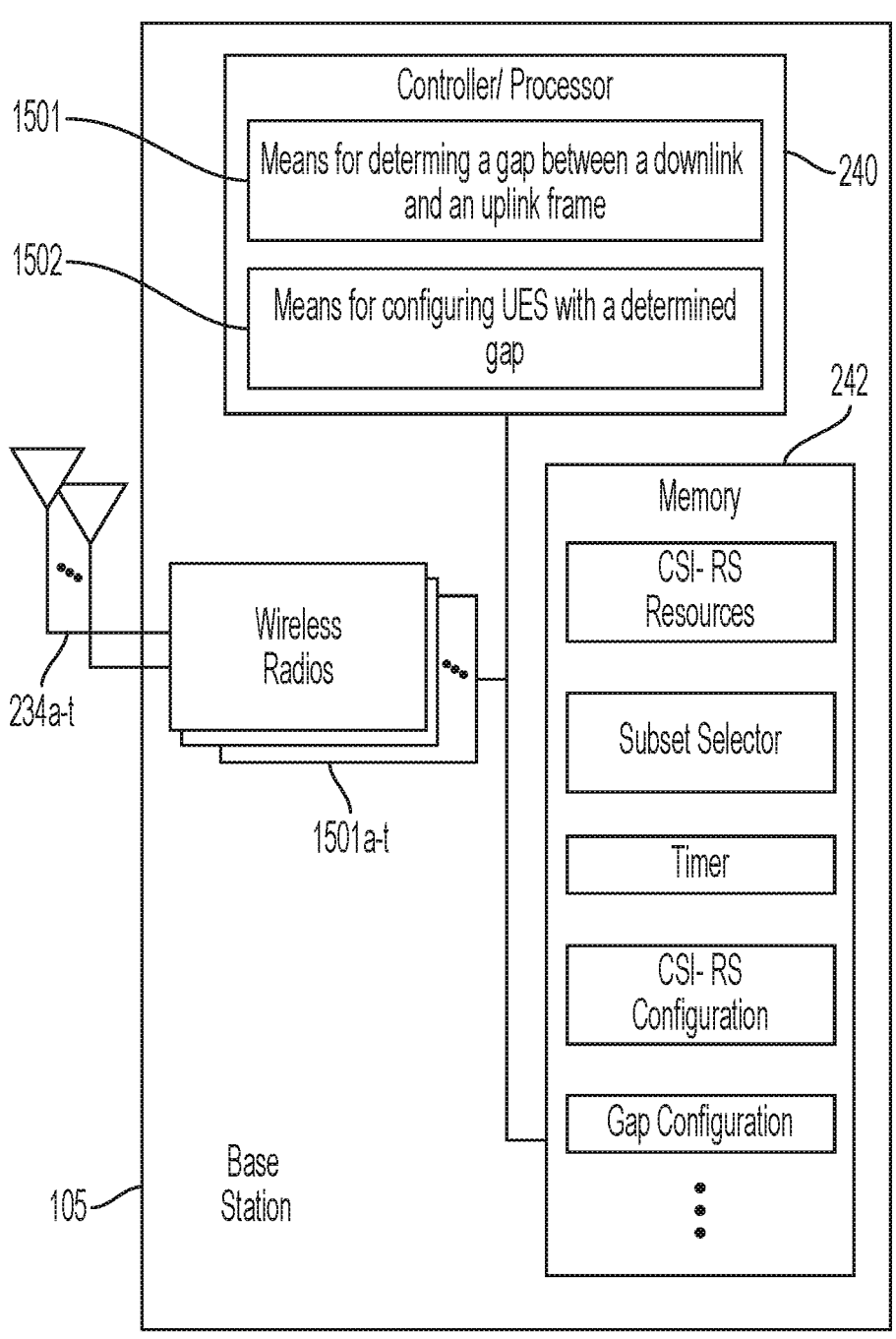
FIG. 15 is a block diagram illustrating eNB configured according to one aspect of the present disclosure.

FIGS. 3, 5, 7, 9, 11, and 13 are block diagrams illustrating example blocks executed to implement one aspect of the present disclosure. The example blocks will also be described with respect to eNB 105 as illustrated in FIG. 15. FIG. 15 is a block diagram illustrating eNB 105 configured according to one aspect of the present disclosure. eNB 105 includes the structure, hardware, and components as illustrated for eNB 105 of FIG. 2 (the template figure showing the components of the UE and base station). For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 1500*a-t* and antennas 234*a-t*. Wireless radios 1500*a-t* includes various components and hardware, as illustrated in FIG. 2 for eNB 105, including modulator/demodulators 232*a-t*, MIMO detector 236, receive processor 238, transmit processor 220, and TX MIMO processor 230. The controller/processor 240 may include means 1501 for determining a gap between a downlink and an uplink transmission and/or may include means 1502 for configuring UEs with a determined gap.

The UE and/or the eNB of FIGS. 14-15 may operate in a number of transmission modes. One such mode is HD-FDD, in which transmit and receive operations are not performed simultaneously, thus allowing to use a switch in place of duplexer for cost reduction in hardware costs.

Figure 16:
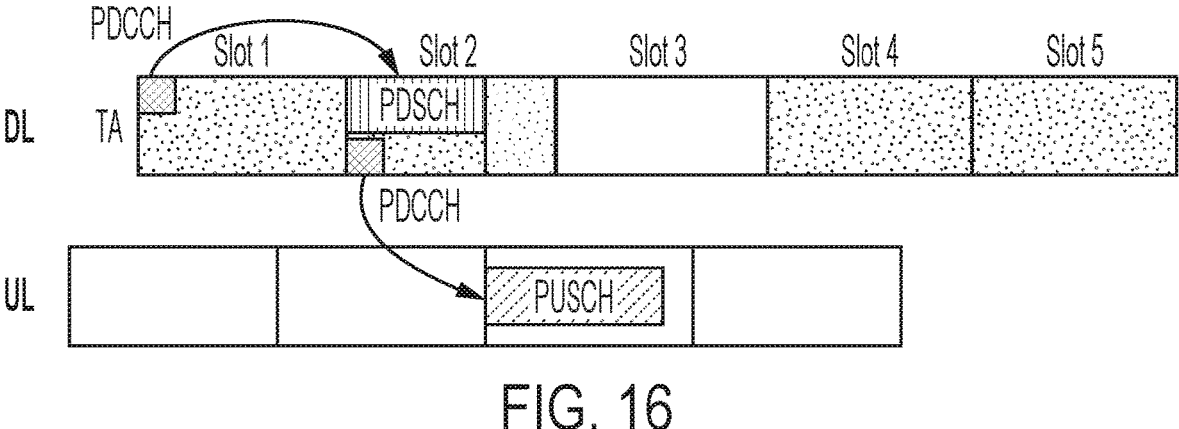
FIG. 16 is a block diagram conceptually illustrating Type A HD-FDD according to some embodiments of the present disclosure.

One type of HD-FDD is illustrated in FIG. 16. FIG. 16 is a block diagram conceptually illustrating Type A HD-FDD according to some embodiments of the present disclosure. In Type A HD-FDD, a DL-to-UL guard period is created by the UE by not receiving the last part of a downlink (DL) subframe immediately preceding an uplink (UL) subframe from the same UE, and no UL-to-DL guard period is defined, but can be created by the eNB implementation by proper TA adjustment. In some hardware implementations of a UE capable of operating in Type A HD-FDD, separate PLLs are used for both transmission and reception, and the guard period is reduced to a few symbols instead of entire slots or subframes. Embodiments of the present disclosure may be operated with UEs configured as Type A HD-FDD UEs, which have non-fixed gaps.

Figure 17:
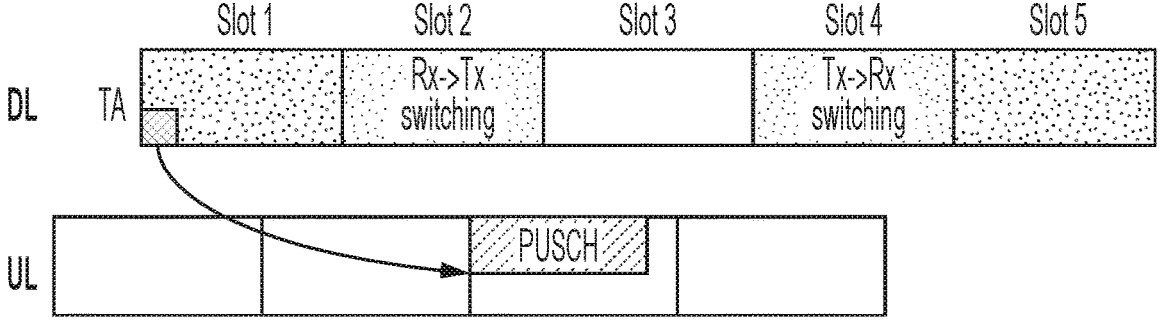
FIG. 17 is a block diagram conceptually illustrating Type B HD-FDD according to some embodiments of the present disclosure.

Another type of HD-FDD is illustrated in FIG. 17. FIG. 17 is a block diagram conceptually illustrating Type B HD-FDD according to some embodiments of the present disclosure. In Type B HD-FDD, a DL-to-UL guard period is created by not requiring the UE to receive a DL subframe immediately preceding an UL subframe from the same UE, and an UL-to-DL guard period is created by not requiring the UE to receive a DL subframe immediately following an UL subframe from same UE. Type B operations may facilitate UE implementations with a single oscillator for Tx and Rx frequency generation by introducing a longer guard period for switching between uplink and downlink.

In some aspects, operating a wireless network with a gap configuration may include a wireless receiving device receiving a gap configuration defining a gap and assuming that certain portions of at least one of a downlink and an uplink transmission are punctured based on a timing advance of a scheduled uplink transmission violating the gap configuration. When the gap configuration is violated, such as by having a downlink transmission scheduled closer than a certain number of symbols to an uplink transmission, the downlink and the uplink transmissions or a combination thereof are punctured.

In a first aspect, a gap configuration may be transmitted from a base station to the UE to define the certain number of symbols between uplink and downlink transmissions.

In a second aspect, alone or in combination with the first aspect, the UE may request an increase of decrease in the gap defined in the gap configuration.

In a third aspect, alone or in combination with one or more of the first and second aspects, the UE may puncture the downlink transmission.

In a fourth aspect, alone or in combination with one or more of the first through third aspects, the UE may puncture the uplink transmission.

In a fifth aspect, alone or in combination with one or more of the first through fourth aspects, the UE may scale the TBS proportional to the number of punctured symbols overlapping the defined gap.

In a sixth aspect, alone or in combination with one or more of the first through fifth aspects, the UE may operate in a HD-FDD Type A mode.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to gap configuration and puncturing may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 3, 5, 7, 9, 11, and 13) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
   determining a gap configuration for a mobile device, wherein the gap configuration defines a desired gap between a scheduled downlink transmission for reception by a mobile device and an uplink transmission from the mobile device;
   determining whether a gap between a scheduled downlink transmission for reception by a mobile device and an uplink transmission from the mobile device is less than a defined number of symbols for the desired gap; and
   puncturing at least one of the downlink transmission and the uplink transmission when the gap is determined to be less than the defined number of symbols.

2. The method of claim 1, wherein the puncturing comprises puncturing the downlink transmission in a number of downlink symbols that overlap the defined number of symbols when the gap is determined to be less than the defined number of symbols.

3. The method of claim 1, further comprising scaling the transport block size (TBS) associated with the downlink or uplink transmission.

4. The method of claim 3, wherein scaling the TBS comprises scaling the TBS proportional to a number of symbols determined to overlap the gap.

5. The method of claim 3, wherein the scaling of the TBS comprises scaling the TBS proportional to a predefined scaling factor received from a higher layer.

6. The method of claim 1, wherein the puncturing comprises puncturing at least one of the downlink transmission and uplink transmission without puncturing a CSI-RS, a DMRS, or a PTRS.

7. The method of claim 1, further comprising postponing the uplink transmission when the gap is determined to be less than the defined number of symbols.

8. The method of claim 1, wherein the postponing comprises postponing the uplink transmission by a number of symbols that overlap the defined number of symbols when the gap is determined to be less than the defined number of symbols.

9. The method of claim 1, wherein the gap configuration is determined based on a configuration received during a RRC connection setup procedure.

10. The method of claim 1, wherein the method of wireless communication is a method for wireless communication on a HD-FDD Type A UE.

11. An apparatus configured for wireless communication, the apparatus comprising:
    at least one processor; and
    a memory coupled to the at least one processor,
    wherein the at least one processor is configured to perform steps comprising:
       determining a gap configuration for a mobile device, wherein the gap configuration defines a desired gap between a scheduled downlink transmission for reception by a mobile device and an uplink transmission from the mobile device;
       determining whether a gap between a scheduled downlink transmission for reception by a mobile device and an uplink transmission from the mobile device is less than a defined number of symbols for the desired gap; and
       puncturing at least one of the downlink transmission and the uplink transmission when the gap is determined to be less than the defined number of symbols.

12. The apparatus of claim 11, wherein the puncturing comprises puncturing the downlink transmission in a number of downlink symbols that overlap the defined number of symbols when the gap is determined to be less than the defined number of symbols.

13. The apparatus of claim 11, wherein the at least one processor is further configured to perform steps comprising scaling the transport block size (TBS) associated with the downlink or uplink transmission.

14. The apparatus of claim 13, wherein scaling the TBS comprises scaling the TBS proportional to a number of symbols determined to overlap the gap.

15. The apparatus of claim 13, wherein the scaling of the TBS comprises scaling the TBS proportional to a predefined scaling factor received from a higher layer.

16. The apparatus of claim 11, wherein the puncturing comprises puncturing at least one of the downlink frame and uplink transmission without puncturing a CSI-RS, a DMRS, or a PTRS.

17. The apparatus of claim 11, wherein the at least one processor is further configured to perform steps comprising postponing the uplink transmission when the gap is determined to be less than the defined number of symbols.

18. The apparatus of claim 17, wherein the at least one processor is configured to postpone by postponing the uplink transmission by a number of symbols that overlap the defined number of symbols when the gap is determined to be less than the defined number of symbols.

19. The apparatus of claim 11, wherein the at least one processor is configured to determine the gap configuration based on a configuration received during a RRC connection setup procedure.

20. The apparatus of claim 11, wherein the apparatus is a HD-FDD Type A UE.

21. A method of wireless communication, comprising
    configuring a gap between a downlink and uplink transmission for a first mobile device;
    determining a downlink transmission for the first mobile device overlaps the configured gap and will be punctured by the first mobile device; and
    allocating resources in the configured gap for use by a second mobile device.

22. The method of claim 21, wherein the allocating resources in the configured gap comprises reallocating resources in a number of downlink symbols that overlap a scheduled downlink transmission for reception by the first mobile device.

23. The method of claim 21, further comprising scaling the transport block size (TBS) associated with the downlink or uplink transmission for the first mobile device.

24. The method of claim 23, wherein scaling the TBS comprises scaling the TBS proportional to a number of symbols determined to overlap the gap.

25. The method of claim 23, wherein the scaling of the TBS comprises scaling the TBS proportional to a predefined scaling factor received from a higher layer.

26. The method of claim 21, wherein configuring the gap comprises transmitting the gap configuration to the first mobile device during a RRC connection setup procedure.

27. The method of claim 21, wherein the allocating resources in the configured gap comprises reallocating resources in a number of uplink symbols that overlap an uplink transmission for transmission by the first mobile device.

28. The method of claim 21, wherein configuring the gap comprises configuring the gap on a HD-FDD Type A UE.

29. An apparatus configured for wireless communication, the apparatus comprising:

at least one processor; and a memory coupled to the at least one processor, wherein the at least one processor is configured to perform steps comprising:

configuring a gap between a downlink and uplink transmission for a first mobile device;

determining a downlink transmission for the first mobile device overlaps the configured gap and will be punctured by the first mobile device; and allocating resources in the configured gap for use by a second mobile device.

30. The apparatus of claim 29, wherein the at least one processor is configured to allocating resources in the configured gap by reallocating resources in a number of downlink symbols that overlap a scheduled downlink transmission for reception by the first mobile device.

31. The apparatus of claim 29, wherein the at least one processor is further configured to perform steps comprising scaling the transport block size (TBS) associated with the downlink or uplink transmission for the first mobile device.

32. The apparatus of claim 31, wherein the at least one processor is configured to perform scaling the TBS by scaling the TBS proportional to a number of symbols determined to overlap the gap.

33. The apparatus of claim 31, wherein the at least one processor is configured to perform scaling the TBS by scaling the TBS proportional to a predefined scaling factor received from a higher layer.

34. The apparatus of claim 29, wherein the at least one processor is configured to configure the gap by transmitting the gap configuration to the first mobile device during a RRC connection setup procedure.

35. The apparatus of claim 29, wherein the at least one processor is configured to perform allocating resources in the configured gap by reallocating resources in a number of uplink symbols that overlap an uplink transmission for transmission by the first mobile device.

36. The apparatus of claim 29, wherein the apparatus comprises a HD-FDD Type A UE.

* * * * *